June 25, 1929. K. YAMAZAKI 1,718,448
AUTOMATIC RECLOSING CIRCUIT BREAKER SYSTEM
Filed March 10, 1928
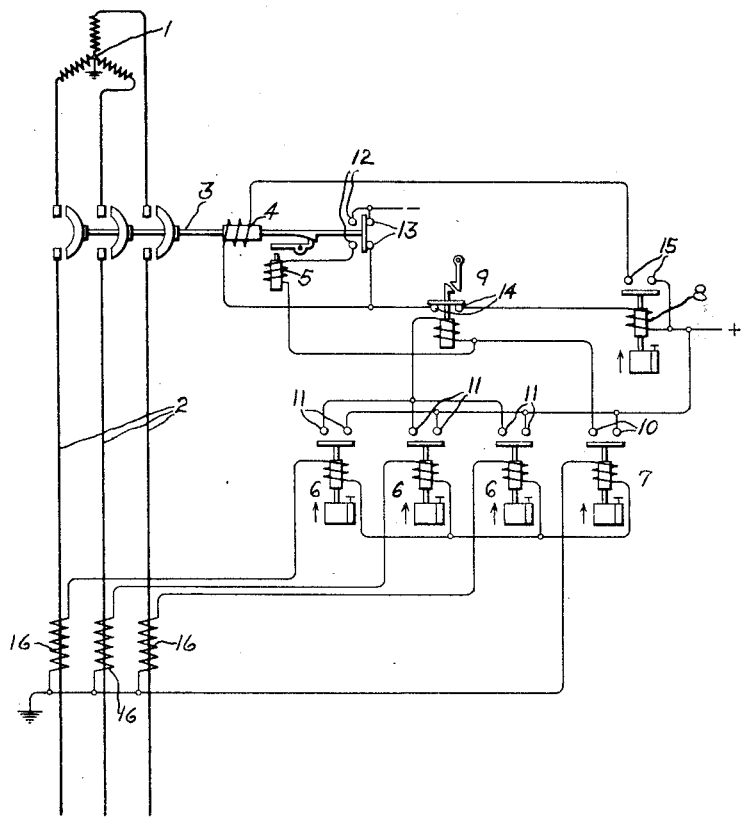
Inventor:
Kunpei Yamazaki
by Charles E. Tullar
His Attorney Patented June 25, 1929.

1,718,448

UNITED STATES PATENT OFFICE.

KUNPEI YAMAZAKI, OF TOKIO-FU, JAPAN, ASSIGNOR TO GENERAL ELECTRIC COMPANY, A CORPORATION OF NEW YORK.

AUTOMATIC RECLOSING CIRCUIT-BREAKER SYSTEM.

Application filed March 10, 1928, Serial No. 260,663, and in Japan May 26, 1927.

My invention relates to automatic reclosing circuit breaker systems and particularly to a system for controlling the connection between an alternating current source whose neutral is grounded and an alternating current load circuit.

One object of my invention is to provide an improved arrangement for selectively controlling the operation of the reclosing of the circuit breaker in accordance with the character of the abnormal condition which caused the circuit breaker to open.

In grounded neutral systems of alternating current distribution, faults between a single conductor and ground are usually of a temporary nature and clear themselves as soon as the load circuit is deenergized whereas faults between phases are usually of a permanent nature. In accordance with the preferred embodiment of my invention I provide an arrangement whereby the circuit breaker is reclosed if opened in response to a ground fault only and is not reclosed if it is opened in response to a phase to phase fault.

My invention will be better understood from the following description taken in connection with the accompanying drawing and its scope will be pointed out in the appended claims.

In the accompanying drawing which shows diagrammatically a system of electric distribution embodying my invention, 1 represents a suitable source of alternating current, shown as a three phase generator with its neutral grounded. The generator 1 is arranged to be connected to a load circuit 2 by suitable switching means 3 shown as a well known latched-in type of circuit breaker which is provided with a closing coil 4 and a trip coil 5.

Any suitable means, examples of which are well known in the art, may be provided for effecting the opening of the circuit breaker 3 in response to a phase to phase fault and in response to a ground fault only. As shown in the drawing this result is effected by means of a current transformer 16, associated with each phase of the load circuit, a separate overload relay 6 connected in series with the secondary of each transformer so as to be energized in accordance with the current in the respective phase conductor and a ground fault responsive relay 7 so connected in the neutral conductor joining the transformers and overload relays that it is energized only in accordance with the current flowing between any one of the main conductors and the ground. Preferably the relays 6 and 7 are arranged in any suitable manner examples of which are well known in the art so that if the ground causes an excessive overload in one or more of the load circuit conductors the associated overload relay 6 operates to close its contacts before the ground relay 7 operates to close its contacts.

Both the overload relays 6 and the ground fault responsive relay 7 are arranged to complete a circuit for the trip coil 5 of the circuit breaker 3 to effect the opening thereof.

Any suitable means examples of which are well known in the art may be provided for effecting the reclosing of the circuit after it has been opened. The particular means shown in the drawing comprises a time delay relay 8 which is arranged to be energized in response to the opening of the circuit breaker 3 and which is arranged to effect the energization of the closing coil 4 of the circuit breaker after it has been open a predetermined time.

In order to render the reclosing relay 8 inoperative to effect the reclosing of the circuit breaker 3 when the opening thereof is due to a phase to phase fault I provide a lockout relay 9 which is arranged to be operated, whenever any one of the overload relays 6 is operated, so as to prevent the subsequent operation of reclosing relay 8. This lockout relay 9 is preferably arranged in any suitable manner examples of which are well known in the art so that it remains in its lockout position until it is reset manually.

The operation of the arrangement shown in the drawing is as follows: When the circuit breaker 3 is closed and the load circuit conditions are normal, the control relays 6, 7, 8 and 9 are in the positions shown in the drawing. No current flows through the ground relay 7 for reasons well known in the art.

When a fault occurs between any one of the conductors of the load circuit 2 and the ground a current flows through relay 7 and after a predetermined time this relay 7 closes its contacts 10 thereby completing a circuit for the trip coil 5 to effect the opening of the circuit breaker 3. This circuit also includes the auxiliary contacts 12 on the circuit breaker 3. As soon as circuit breaker 3 opens a circuit is completed for the reclosing relay 8 through auxiliary contacts 13 on the circuit breaker 3 and contacts 14 of the lockout relay 9. After a predetermined time, reclosing relay 8 closes its contacts 15 and thereby completes a circuit for the closing coil 4 of the circuit breaker 3 through auxiliary contacts 13 on the circuit breaker 3 so that the circuit breaker is reclosed. If the ground is still present when the circuit breaker is reclosed the relay 7 operates again and the above cycle of operation is repeated. Any suitable means examples of which are well known in the art may be provided for limiting the number of times the reclosing relay 8 can effect the reclosing of the circuit breaker.

When, however, a fault occurs which causes one of the overload relays 6 to operate and close its contacts 11 a series circuit for the lockout relay 9 and the trip coil 4 is completed so that the circuit breaker is opened and the lockout relay 9 is actuated to its lockout position in which position its contacts 14 are open. Therefore the closing of the auxiliary contacts 13 of the circuit breaker 3 when it opens, does not complete a circuit for the reclosing relay 8 and the circuit breaker 3 remains open until the relay 9 is reset to its normal position.

When a fault occurs which effects the energization of the ground relay 7 as well as effecting the operation of one or more of the overload relays 6, the reclosing of the circuit breaker is prevented as the overload relays 6 are designed to operate and close their contacts 11 before the relay 7 closes its contacts 10.

While I have in accordance with the patent statutes, shown and described my invention as applied to a particular system and as embodying various devices diagrammatically indicated, changes and modifications will be obvious to those skilled in the art and I therefore aim in the appended claims to cover all such changes and modifications as fall within the true spirit and scope of my invention.

What I claim as new and desire to secure by Letters Patent of the United States is:

1. In combination, two alternating current circuits, a circuit breaker connecting said circuits, means responsive to a phase to phase fault on one of said circuits for effecting the opening of said circuit breaker, means responsive to a ground fault on one of said circuits for effecting the opening of said circuit breaker, reclosing means for effecting the closing of said circuit breaker when it is open, and means controlled by said phase to phase fault responsive means for rendering said reclosing means inoperative to reclose said circuit breaker.

2. In combination, two alternating current circuits, a switch connecting said circuits, means responsive to a ground fault on one of said circuits for effecting the opening of said switch and the subsequent reclosing thereof, and means responsive to a phase to phase fault on one of said circuits for effecting the opening of said circuit breaker and for preventing the automatic reclosing thereof.

3. In combination, two alternating current circuits, a switch connecting said circuits, means responsive to an abnormal current condition of one of said circuits for effecting the opening of said switch, additional means responsive to a ground fault on one of said circuits for effecting the opening of said switch, means responsive to the opening of said switch for effecting the closing thereof after it has been open a predetermined time, and means controlled by said current responsive means for rendering said reclosing means inoperative to reclose said switch.

4. In combination, two alternating current circuits, a switch connecting said circuits together, means responsive to the opening of said circuit breaker for effecting the reclosing of said circuit breaker, means responsive to a ground fault on one of said circuits for effecting the opening of said circuit breaker, electroresponsive means for rendering said reclosing means inoperative to reclose said circuit breaker, and means responsive to a phase to phase fault on one of said circuits for effecting the opening of said circuit breaker and the operation of said electroresponsive means to render said reclosing means inoperative.

5. In combination, two alternating current circuits, a switch connecting said circuits together, means responsive to the opening of said circuit breaker for effecting the reclosing of said circuit breaker, a ground relay connected to one of said circuits so as to be energized in accordance with the circuit between a conductor thereof and ground and arranged to effect the opening of said circuit breaker, overload means connected to each conductor of one of said circuits so as to be energized in accordance with the current in the respective conductor and arranged to effect the opening of said circuit breaker, and means controlled by said overload means for rendering said reclosing means inoperative to reclose said circuit breaker when opened by said overload means.

6. In combination, two alternating current circuit, a switch connecting said circuits, means responsive to abnormal current conditions in one of said circuits for effecting the opening of said switch, reclosing means for effecting the closing of said switch after it has been opened by said abnormal current responsive means, and means responsive to a phase to phase fault on said one of said circuits for preventing said reclosing means from effecting the subsequent reclosing of said circuit breaker.

In witness whereof, I have hereunto set my hand this 17th day of February, 1928.

KUNPEI YAMAZAKI.